US005419571A

United States Patent [19]

Vaughan

[11] Patent Number: 5,419,571

[45] Date of Patent: May 30, 1995

[54] WHEEL CHAIR WITH PROVISIONS FOR PATIENT WALKER

[76] Inventor: Jack N. Vaughan, 702 Central St., Lafayette, Ind. 47905

[21] Appl. No.: 171,922

[22] Filed: Dec. 22, 1993

Related U.S. Application Data

[63] Continuation-in-part of Ser. No. 977,106, Mar. 8, 1993, abandoned.

[51] Int. Cl.[6] ..... B62M 1/14

[52] U.S. Cl. ..... 280/250.1; 280/304.1; 297/DIG. 4

[58] Field of Search ..... 280/250.1, 647, 648, 280/649, 304.1, 293, 304, 297, 47.4, 200; 297/118, DIG. 4

[56] References Cited

U.S. PATENT DOCUMENTS

| | | | |
|---|---|---|---|
| 2,219,260 | 9/1938 | Bowser | 297/DIG. 4 X |
| 2,556,121 | 6/1951 | Thomas | 280/304.1 |
| 2,596,055 | 5/1952 | Thomas | 280/304.1 |
| 2,855,979 | 10/1958 | Hubbard | 297/DIG. 4 X |
| 3,023,048 | 2/1962 | Barton | 280/200 X |
| 3,398,974 | 8/1968 | Edwards et al. | 280/304.1 |
| 3,405,954 | 10/1968 | Wolfe | 280/304.1 |
| 3,584,890 | 4/1969 | Presty | 280/304.1 X |
| 3,912,032 | 10/1975 | Benz et al. | 280/250.1 X |
| 3,999,778 | 12/1976 | Markiel | 280/304.1 |
| 4,511,157 | 4/1985 | Wilt, Jr. | 280/304.1 |
| 4,934,725 | 6/1990 | Owens | 280/304.1 |
| 5,156,226 | 10/1992 | Boyer et al. | 280/250.1 X |

*Primary Examiner*—Margaret A. Focarino
*Assistant Examiner*—F. Zeender
*Attorney, Agent, or Firm*—Malin, Haley, DiMaggio & Crosby

[57] ABSTRACT

A wheel chair, collapsible or otherwise, that includes provisions for a patient walker telescopically extendable from frame members of the wheel chair for operation in a first position as a conventional wheel chair and a second position where certain frame members extend forward with handholds to allow the patient to utilize the device quickly and easily as a walker. The handholds are adjustable vertically to accommodate users of different heights and the frame members are disposed telescopically in such a way so that the device may be easily converted from the wheel chair mode to the walker mode by the user. A hinged seat allows the device to be collapsed for storage purposes or for the seat to be lifted for additional room for the walker.

14 Claims, 6 Drawing Sheets

WHEEL CHAIR WITH PROVISIONS FOR PATIENT WALKER

This is a Continuation-in-part of U.S. patent application No. 07/977,106, filed Mar. 8, 1993, now abandoned.

BACKGROUND OF THE INVENTION

1. Field of the Invention

This invention relates generally to a wheel chair that can also be used as a patient walker, and in particular to a wheel chair that has a readily extendible frame structure that permits two modes of operation, one mode as the wheel chair and the second mode which allows a patient to safely be supported while using the entire device as a walker, and provides for immediate seating as needed for resting.

2. Description of the Prior Art

The use of wheel chairs for patients who are immobilized or partially immobilized is well known in the prior art. Also known in the prior art are wheel chairs that include essentially a separate walker structure. One of the main drawbacks of the prior art combinations of wheel chairs and walkers is that their overall large size and complex structure makes them difficult to maneuver and convert to different modes. U.S. Pat. No. 2,855,979 issued to W. R. Hubbard, Oct. 14, 1958, shows a combined invalid wheel chair and walker. U.S. Pat. No. 4,934,725 issued to Jessie Owens, Jun. 19, 1990, shows a portable standing attachment that protrudes out in front of the wheel chair used with a wheel chair. U.S. Pat. No. 2,596,055 issued to J. D. Thomas, May 6, 1952, shows a detachable wheel chair walking apparatus that connects detachably from the wheel chair. U.S. Pat. No. 3,999,778 issued to Henry Markiel, Dec. 28, 1976, shows an adjustable walker attachment for wheel chairs. U.S. Pat. No. 3,584,890 issued to Frank P. Presty, on Jun. 15, 1971, shows a wheel chair structure that has an add on walker structure. The devices shown are typically larger than a conventional wheel chair and are also cumbersome to change between modes, especially for a partially immobile person.

With much more of society's facilities being wheel chair accessible, it is also important that the size of the wheel chair remain standardized so that the user of the wheel chair can get the benefit of these facilities.

The present invention provides for the user to emulate the parallel bars found in therapy rooms except that the present invention does not require the user to slide his or her hands along the parallel bars, thereby affording the user the opportunity to have two-handed support at all times. The present invention also provides the user with the opportunity to get walking exercise at any time without the aid of a nurse or others. Standard wheelchairs do not easily provide for a user to easily get into a standing position. The present invention affords the semi-mobile user the opportunity to pull himself up into a standing position very easily and without help. Furthermore, the present invention provides for easy access from the front with no obstruction, thereby allowing the user to enter from the edge of a bed.

The present invention overcomes problems shown in the prior art by providing a device that can be quickly and easily converted from a standard wheel chair into a suitably sized walker that utilizes the basic structure of the wheel chair safely and comfortably for the patient.

The present invention overcomes all of the above problems by allowing for a wheel chair that can be easily converted to a safe walker using telescopic frame members that can be embodied in a fold-up wheel chair or a non fold-up wheel chair.

SUMMARY OF THE INVENTION

An apparatus comprising a wheel chair and walker capable of and convertible between two modes of operation, said apparatus including two pairs of wheels connected to a rigid frame structure, the frame members being symmetrical on each side, the frame structure including on each side a pair of vertical parallel support members (front and rear) and a pair of horizontal support members (upper and lower).

The rear parallel frame members are vertical and may include upper angled portions that include handgrips disposed thereon. Each vertical frame member in the rear is also connected to a wheel that has a conventional axle and wheel movement. The base of each rear vertical frame member is attached to a lower horizontal frame member that extends forward and is coupled to a front wheel on each side and a front vertical frame member. Each front vertical frame member has attached to it a foot pad or foot rest at its bottom end. The foot rest is rotatable for receiving the person's foot while seated and for moving it out of the way when the person is using the device as a walker. It should be noted that the foot rest can be removable altogether. Each front vertical frame member is attached to an upper horizontal frame member at one end, the upper horizontal member connecting at its opposite end and terminating at the vertical rear frame member, forming a side frame. Each upper horizontal member has a hand rest or hand hold which is attached at the forward end of the device, and includes arm rests. In one embodiment, an additional angular frame member portion attaches from the arm rest of the upper horizontal frames to near the rear portion of the bottom horizontal frame member for structural integrity. The additional angular frame member also provides for seat restraint and guiding slide for the seat support vertical movement during the folding and unfolding operation.

The upper and lower horizontal frame members include an inner and outer member with a hard low friction sleeve made of a low friction material such as that known under the trademark TEFLON for each that telescopically slide relative to each other to permit extending the horizontal frame members forward of the seat of the wheel chair, including the front smaller wheels, to a position that allows walking room in front of the seat of the wheel chair. The upper telescopic horizontal frame members include arm rests and hand holds to aid in the walking action. On each side is a bar that is connected to the front vertical frame member and to a stopping mechanism that includes a spring that stops the telescopic action of each frame member in the extended forward position.

In one embodiment, the wheel chair is designed to be foldable or collapsible if desired. Each of the side frames is moveable relative to the other for a collapsible model in which a rigid chair seat is hinged on one side, allowing the seat to be pivoted from a horizontal position to a vertical position. In this mode a rigid chair seat has a hinge along one side that connects to a frame member that supports the chair seat, while on the other side the chair seat itself has a pair of pins that fit into another frame member that support the chair seat. When the chair seat is in the upper position, the back of the seat, which includes a fabric panel for back support and which is flexible and collapsible, allows the entire unit of both frames to be moved closely adjacent each other, thereby allowing the wheel chair to be in a collapsed position. The chair seat may be secured to a horizontal frame member by hook and loop type fasteners such as VELCRO ®, by a strap and snap closure or connector attached to one end of the seat and to one of the horizontal bars, or by using spring loaded hinges.

In an alternate embodiment, the wheel chair is designed to be non-foldable. In this mode, a rigid chair seat is able to be flipped up to abut the back of the seat. The back of the seat includes a rigid panel for back support which is non-flexible. In this embodiment, the upper horizontal frame members have parallel bars similar to those used in therapy rooms pivotally and slidably connected thereto, thereby allowing a user to have two-handed support at all times.

In addition, for safety purposes while seated, a pair of 90° movable foot rests are disposed on each of the front vertical frame members so that the foot rests can be moved from an operable position essentially perpendicular to the bottom frame member to a position parallel to the bottom frame member where the foot rests do not interfere with a person walking and utilizing the device in the extended position.

The handrails or hand supports are also adjustable vertically to accommodate the height of a particular user.

Each of the frame members may be made of a rigid and durable, rectangular or cylindrical steel pipe. However, other types of rigid, strong materials, such as fiberglass or plastic, can also be used for the frame members.

In using the device as a wheel chair in its retracted position, the device functions as a conventional wheel chair with the patient sitting in the chair, with the foot rests extended for engagement with the patient's feet and the wheels operated normally.

To operate the device as a walker, the seated patient merely needs to push forward on the handrails and/or the foot rests and move each side forward, simultaneously or otherwise, until the sides come to a stop at the extended position where they can be secured if desired. The device is then ready to be used as a walker. The device allows for easy access from a front entry position at the side of a bed. The foot rests swing easily and are spring loaded from a first usable position to a second stored position facing forward and aft. The seat can flip up or down to allow the patient sufficient room to have a full stride if needed or also can be put down for allowing the patient to sit on an immediate basis.

It is an object of this invention to provide an improved wheel chair that can be used quickly and safely and also readily converted to a walker.

It is another object of this invention to provide a wheel chair that has an extendable frame structure that can be easily moved to a separate position for use as a walker and that can be folded up and collapsed for storage or transport.

And yet still another object of this invention is to provide a wheel chair that can be used as a walker wherein the added weight over a standard fold-up type wheelchair is negligible.

In accordance with these and other objects which will become apparent hereinafter, the instant invention will now be described with particular reference to the accompanying drawings.

DESCRIPTION OF TEE PREFERRED EMBODIMENTS

Figure 1:
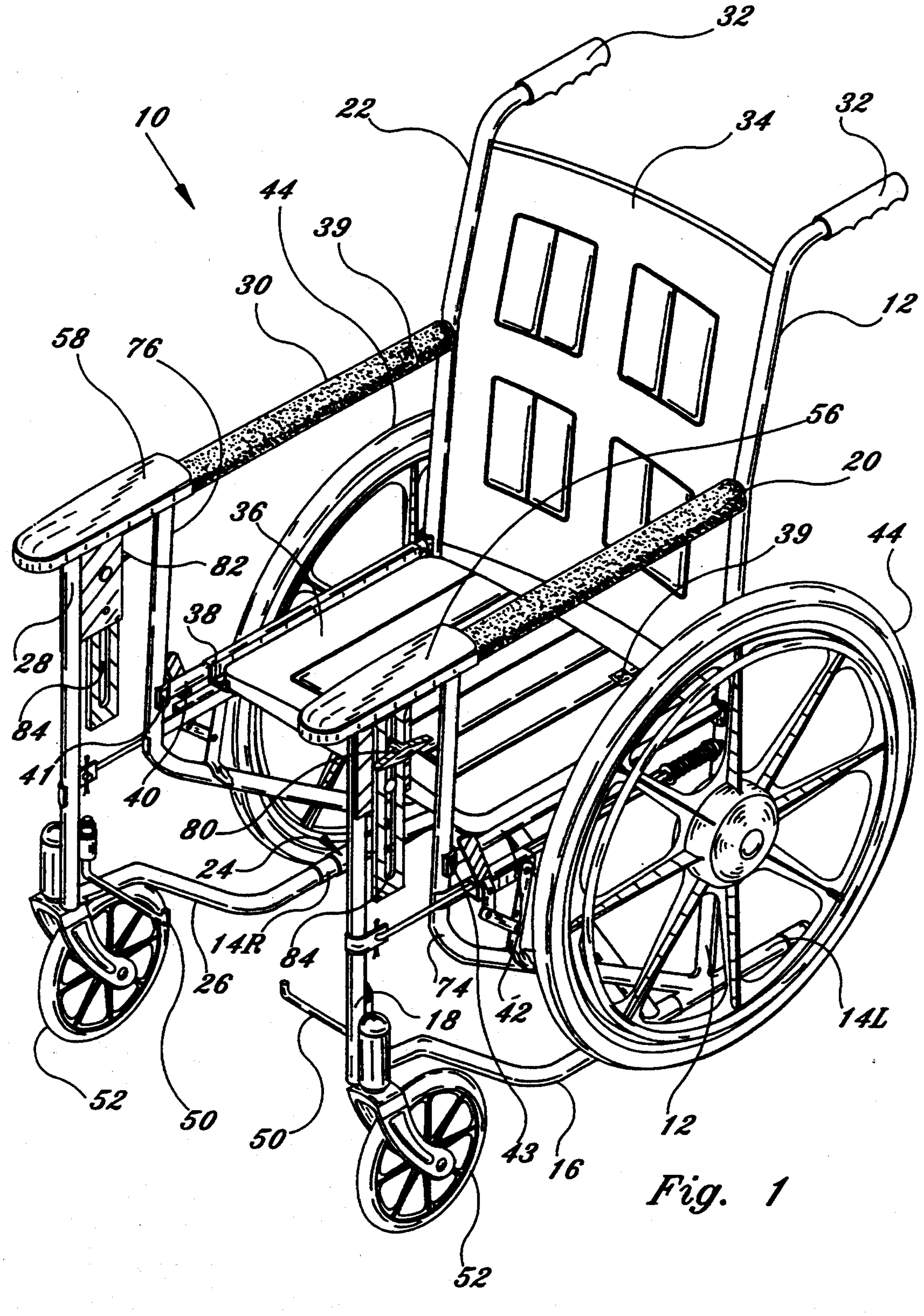
FIG. 1 shows a perspective view of the present invention in a retracted position.
Figure 2:
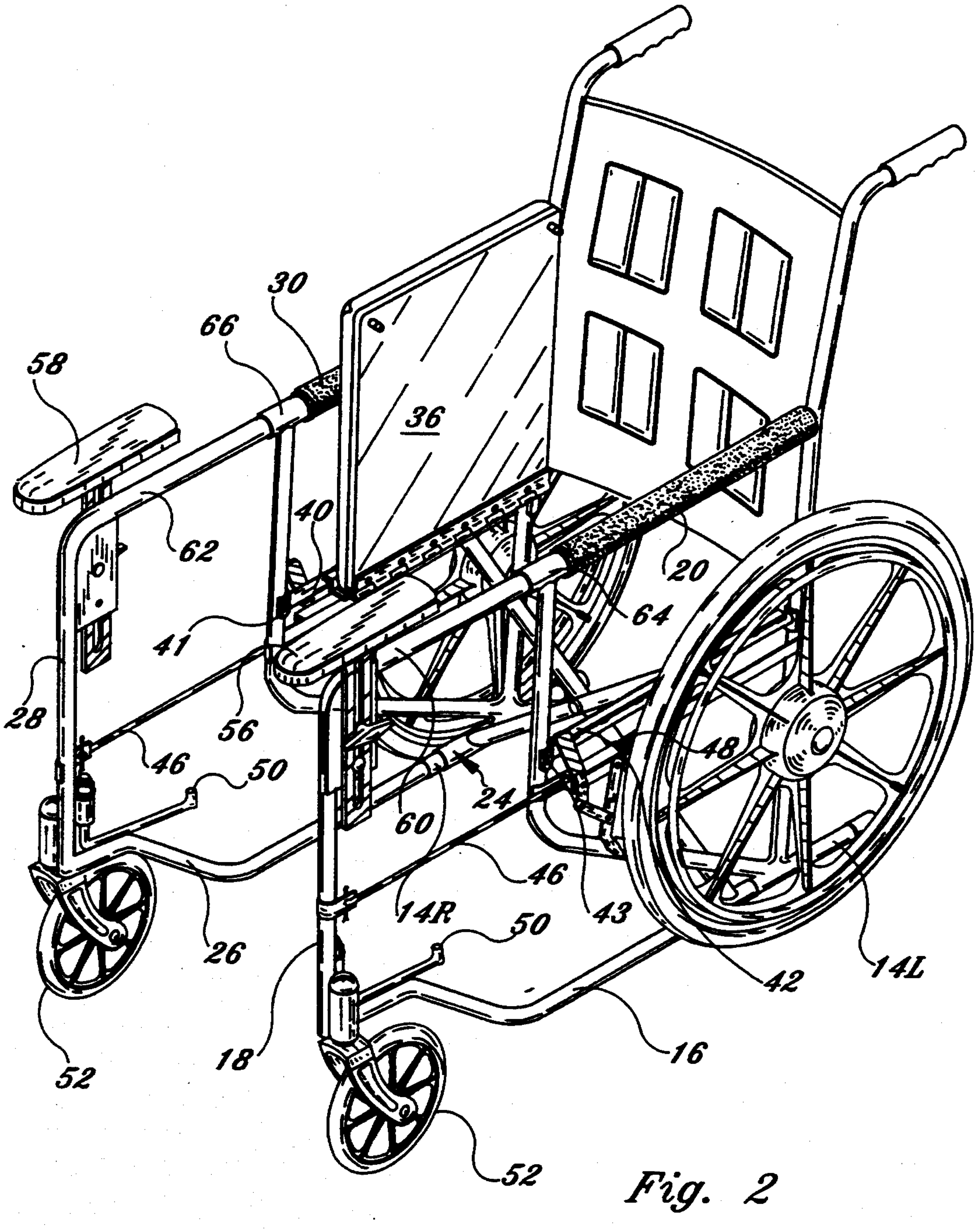
FIG. 2 shows a perspective view of the present invention in an extended position for use as a walker.

Referring now to the drawings and in particular FIG. 1 and FIG. 2, the present invention is shown generally at 10, comprised of a pair of rear, rigid, vertical frame members 12 and 22 on each side of the device connected to wheels 44 and terminating at their base by rigid connection to a horizontal frame member 14 and 24 which also connect to the wheel. Frame members 12 and 22 each have upper angled portions with handgrips 32 disposed thereon. Front vertical frame members 18 and 28 are rigidly attached at their base to horizontal frame members 16 and 26 which telescopically engage horizontal frame members 14R and 14L along the base of the device. Front vertical frame members 18 and 28 have wheels 52 connected proximate their base. The front vertical frame members 18 and 28 are connected at their upper end to upper horizontal frame members 64 and 66. Horizontal frame members 64 and 66 are connected at their opposite end and terminate rigidly in the vertical rear frame members 12 and 22. Arm rest padding 20 and 30 is disposed about a portion of horizontal frame members 64 and 66 to provide comfort to the user and also to provide a better gripping surface.

A movable seat which is rigid 36 is connected on one side to hinge 38. Hinge 38 is rigidly attached to a sub-horizontal frame member 40 that connects between back frame member 22 and supplemental frame member 76. Frame member 76 connects to upper horizontal frame member 66. Movable seat 36 is connected on another side to sub-horizontal frame member 42 that connects between vertical frame member 12 and supplemental frame member 74. Frame member 74 connects to upper horizontal frame member 64. A pair of hand rests or handgrips 56 and 58 are adjustably attached at the forward end of the device on each side at the top of front vertical frame members 18 and 28, respectively. A pair of wing nuts or handles 80 and 82 tighten about slots 84 to adjust the handgrips 56 and 58 to a desired position along the slot by these conventional threaded connectors for people of different heights. In the preferred embodiment, small patches of hook and loop material 39 are disposed on the seat 36 and padded arm rest 30 to hold seat 36 in the up position.

As shown in FIG. 1 the wheel chair includes a fabric vertical backing portion 34 that is connected to the back vertical frame members 12 and 22 to provide a back support when someone is seated in the chair.

As shown in FIG. 1 the device is configured for use as a wheel chair. Movable foot rests 50 are shown in position for use as a wheel chair. Note that the device may also collapse by raising seat 36 to a vertical position along the hinge 38 which then allows for the movement of both side frames together in a collapsed position. That feature is described in greater detail hereinafter.

Referring now to FIG. 2, the device is shown with additional horizontal upper frame members 60 and 62 which telescopically fit within the frame members 64 and 66 which allow for the extension of the upper frame member 60 and 62 forward away from the chair portion. Likewise, bottom frame members 16 and 26, which are horizontal, telescopically fit within frame members 14R and 14L so that the bottom horizontal frame members also slide out telescopically in a forward direction. This allows the front vertical frame members 18 and 28 also to move as a unit and to slide out comfortably using wheels 52. A pair of stopping rods 46 on each side include a spring stop 48 on each side to prevent further travel forward of the front frame section. A pair of hand rests or handgrips 56 and 58 are adjustably attached at the forward end of the device on each side at the top of front vertical frame members 18 and 28, respectively. In the configuration shown in FIG. 2 the device is configured for walking and provides an adequate compartment over the front small wheels 52 so that the patient can walk using the handgrips 56 and 58 with the wheel chair following behind while distributing his or her weight over the smaller wheels 52 of the device as needed. Note also that the seat chair 36 can flip up so that with the seat up a person can walk with a greater stride.

To configure the device in the extended position the seated patient can easily push forward on the handgrips and/or the foot rests until the stops are reached so that the device is totally stable and easily movable to the extended position or the retracted position by the patient himself. Note that in the extended position shown in FIG. 2 that the foot rests 50 have been moved to a position parallel to the horizontal frame members so that they are out of the way and do not cause an impedance to a person using the walker portion.

Referring now to FIG. 2, a collapsible cross-brace assembly 24 is shown, wherein the rigidly connected tubular ends of each cross-brace member rotate about frame members 14R and 14L on their respective side. The scissor-like action that occurs upon collapsing forces sub-horizontal frame members 40 and 42, which are rigidly connected to their respective cross-brace member, to rise within the framework. The saddle-shaped ends 41 and 43 of frame members 40 and 42 are plastic inserts that allow frame members 40 and 42 to rotate as needed. The cross-brace members are located as far to the back as possible to allow for a greater stride. The cross-brace members are shown as being straight in FIG. 2. However, depending upon the exact shape and location of the lower part of members 74 and 76, the cross-brace members could be curved locally or curved to accommodate any interference that would preclude collapsing the wheel chair to as small a width as possible.

Figure 3:
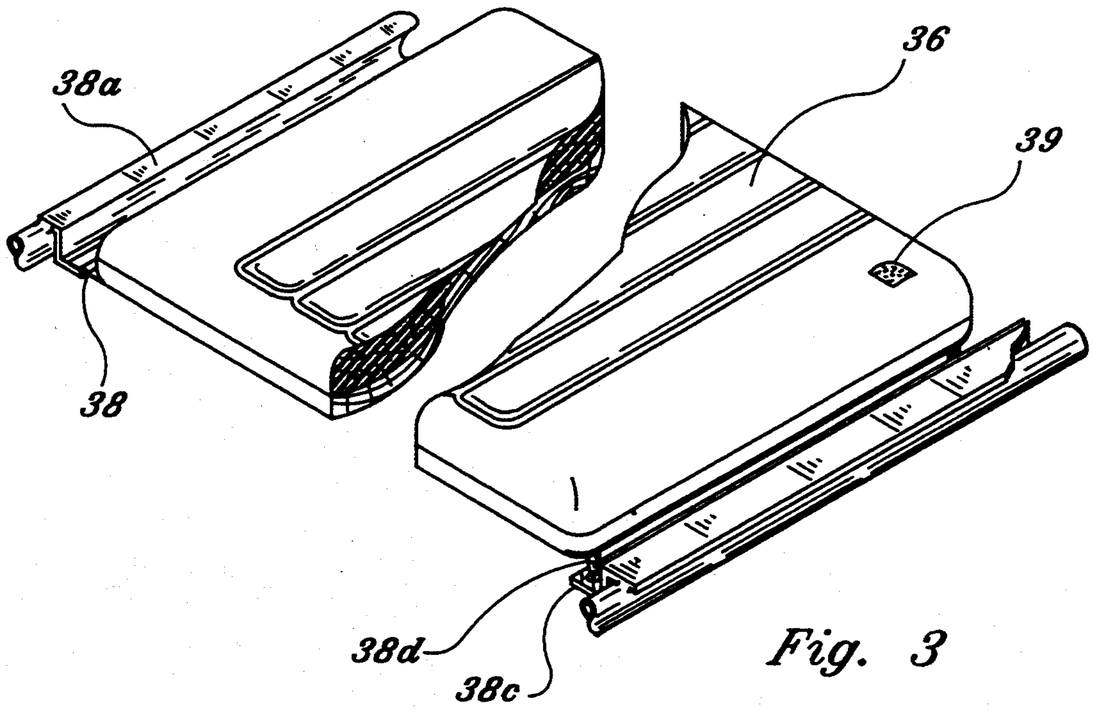
FIG. 3 shows a top perspective view of the pivotal seat mechanism partially cut away; the seat can be raised or lowered for use with the present invention.

Referring now to FIG. 3, the seat is shown comprised of a rigid seat structure 36 which may include a padded portion attached firmly to a rigid board or other rigid material rectangularly shaped and connected at one end to a hinge 38 and a bracket **38*a* that is welded on the frame on one side which engages on the opposite side another bracket 38c having holes that receive pins 38*d* attached to the bottom edge of the seat 36. Thus, the seat locks in place in the down position with the pins 38*d* and is hinged in the up position. In the preferred embodiment, small patches of hook and loop material 39 are disposed on the seat and the upper horizontal frame member, respectively, to hold the seat in the up position. However, a strap with fasteners for other connectors may be used to hold the seat up in the up position. The seat 36** may be fiberglass, plastic, or the like.

Figure 4:
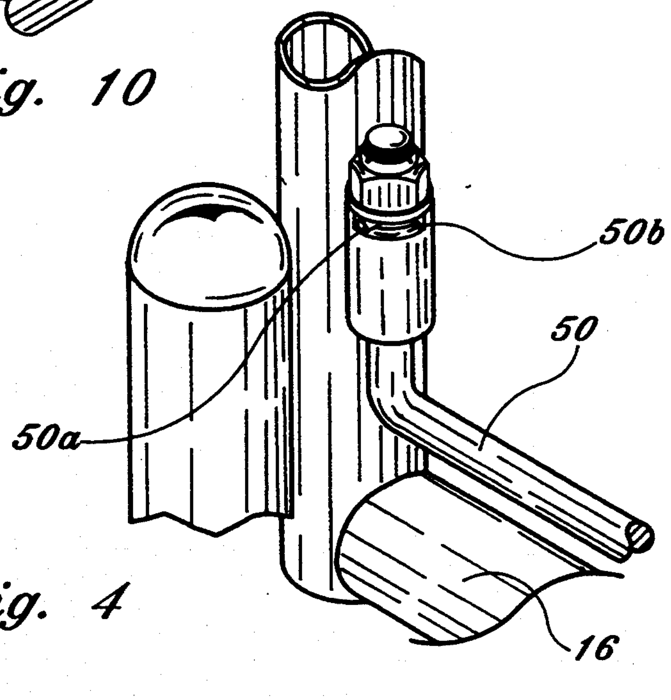
FIG. 4 shows a perspective view of the foot pad or foot rest on one side, partially cut away.

FIG. 4 shows the foot pad or foot rest 50 which in this embodiment is a bar that can swing 90° and includes a rigid stop **50*a* connected thereto that moves within a slotted opening 50*b* from one position to the other and may include a spring inside (not shown) so that the foot pad or foot rest 50 can be rotated to one of two positions, essentially 90° apart. The position is shown parallel to the frame member 16 for use as a walker. Foot rest 50** can be swung 90° inward for use as a wheelchair.

Figure 5:
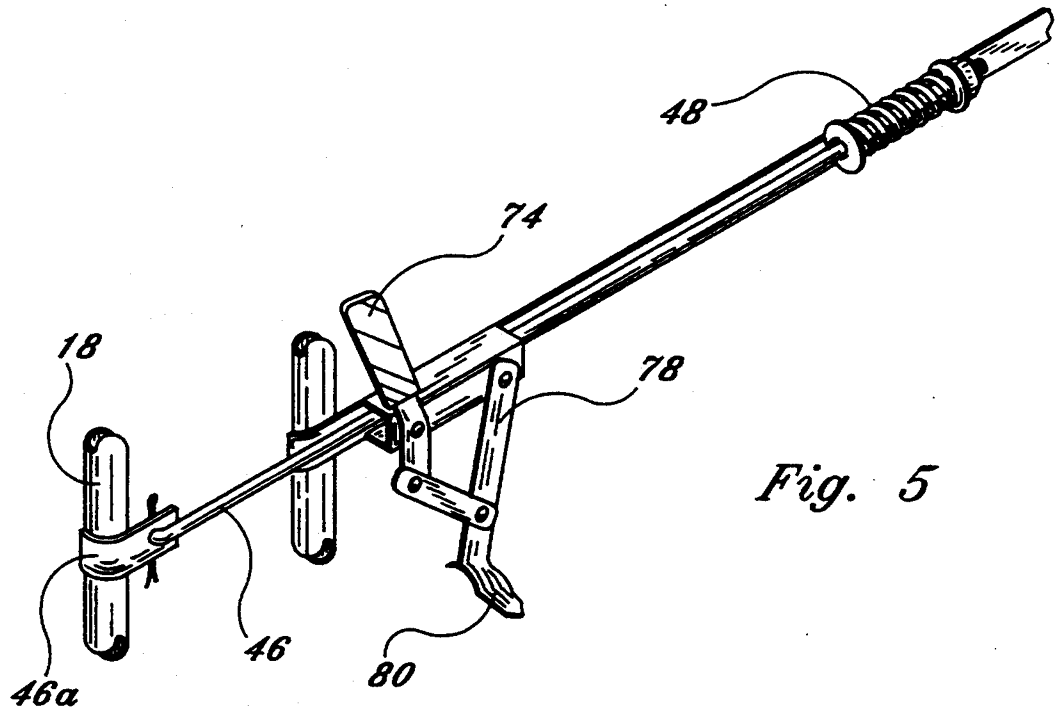
FIG. 5 shows a perspective view of the stop rod that is used to stop the walker frame in the extended position.

FIG. 5 shows the stop mechanism that includes a rod 46 connected to the front frame member 18 by clip **46*a*. Rod 46 slides forward through a housing that includes linkage 78 connected to the brakes 80 and a brake actuating handle 74. Extension is limited by the spring stop 48** when its forward movement reaches the aforementioned housing.

To utilize the device in the extended position, a configuration as shown in FIG. 2 is obtained by the seated patient pushing forward on the handgrips and/or the foot rests. Once the device is in the extended position and the foot rests stored, the device is ready for use.

Figure 6:
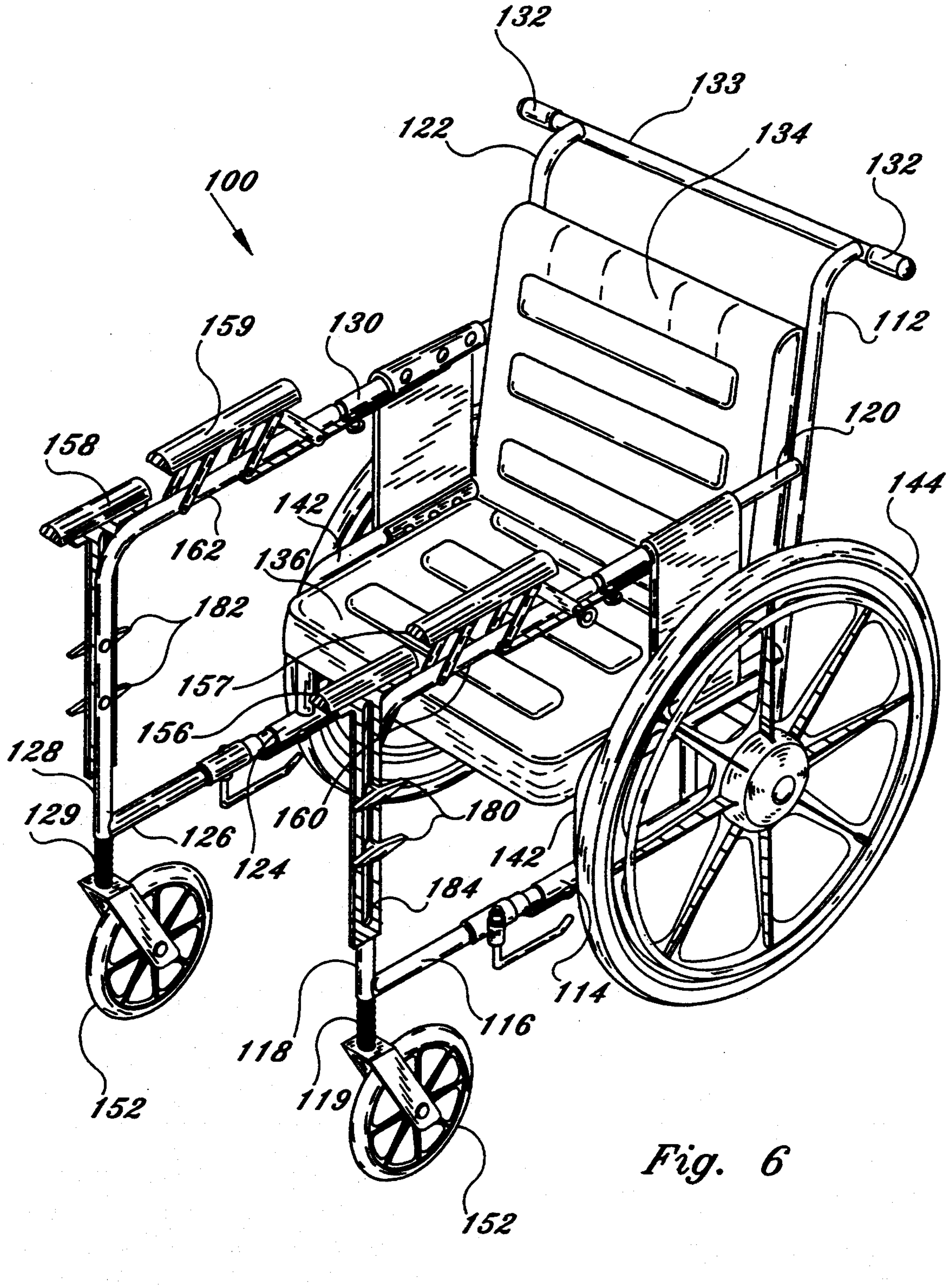
FIG. 6 shows a perspective view of an alternate embodiment of the present invention in a retracted position.

Referring now to FIG. 6, an alternate embodiment of the present invention is shown generally at 100, comprised of a pair of rear, rigid, vertical frame members 112 and 122 on each side of the device connected to wheels 144 and terminating at their base by rigid connection to a horizontal frame member 114 and 124 which also connect to the wheel. Frame members 112 and 122 each have upper angled portions with handgrips 132 disposed thereon, wherein frame member 133 connects frame members 112 and 122 together. Front vertical frame members 118 and 128 are rigidly attached at their base to horizontal frame members 116 and 126 which telescopically engage horizontal frame members 114 and 124 along the base of the device. Front vertical frame members 118 and 128 have springs 119 and 129 proximate their base, with pivoting wheels 152 connected through the springs. The front vertical frame members 118 and 128, through their right angle extensions 160 and 162 respectively, are telescopically connected at the upper end to upper horizontal frame members 120 and 130. Horizontal frame members 120 and 130 are connected at their opposite ends and terminate rigidly in the vertical rear frame members 112 and 122.

A movable seat 136, which is rigid, is able to be flipped up to abut the back of the seat 134. The back of the seat 134 includes a rigid panel for back support which is non-flexible. Movable seat 136 is connected to frame member 142 on each side that connects between horizontal frame member 114 and vertical frame member 112 and between horizontal frame member 124 and vertical frame member 122. A pair of hand holds 156 and 158 are adjustably attached at the forward end of the device on each side at the top of front vertical frame members 118 and 128, respectively. A pair of conventional threadable wing nuts or handles 180 and 182 are tightened in slots 184 to adjust the hand holds 156 and 158 to a desired position along slot 184 for people of different heights. Parallel bars 157 and 159, similar to those used in therapy rooms, are connected to frame members 160 and 162, respectively, wherein the parallel bars are pivotally mounted and are adjusted by a sliding mechanism which is described in greater detail hereinafter.

Figure 7:
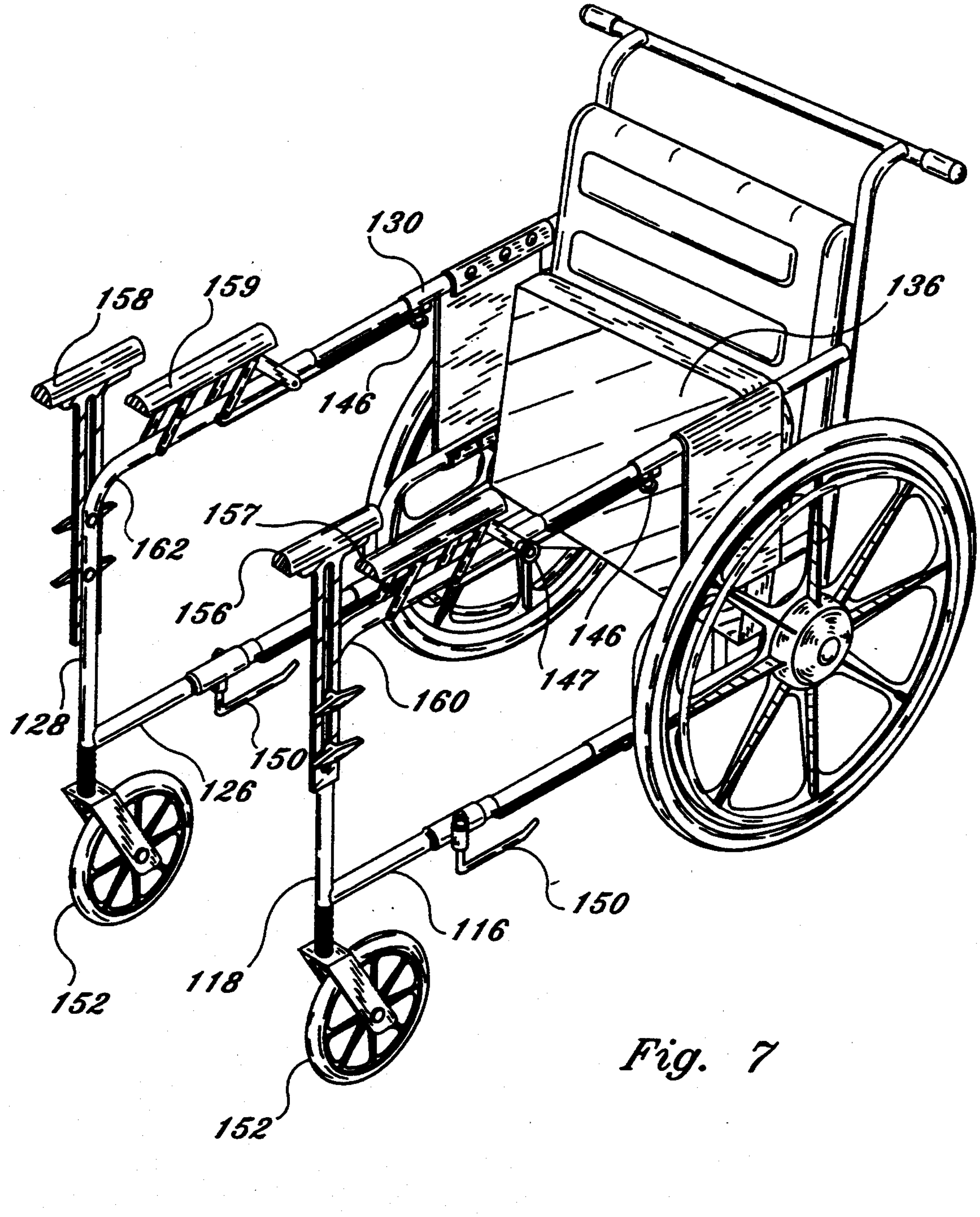
FIG. 7 shows a perspective view of the alternate embodiment of the present invention in an extended position for use as a walker.

Referring now to FIG. 7, the device is shown in its extended position with frame members 160 and 162 extended forward away from the chair portion. Likewise, bottom frame members 116 and 126 also slide out telescopically in a forward direction. This allows the front vertical frame members 118 and 128 to move as a unit and to slide out comfortably using wheels 152. A pair of stopping bolts 146 on each act as a limiter to prevent further travel forward of the front frame section. In the configuration shown in FIG. 7, the device is configured for walking by the seated person pushing forward either on the hand holds 156 and 158, the parallel bars 157 and 159, and/or the foot rests 150 in their inward position until the extension limit is reached. The device provides an adequate compartment over the front small wheels 152 so that the patient or user can stand up, and using the hand holds 156 and 158 or parallel bars 157 and 159, walk forward with the wheel chair after moving foot rests 150 to the stored position if they were used for extension. Furthermore, as seen in FIG. 7, parallel bars 157 and 159 are able to be elevated and are available for use by a smaller patient or one that is in an early stage of therapy as an aid to stand up or to support a user while walking. Note also that the chair seat 136 can flip up so that with the seat up, a person can walk with a greater stride from either set of hand supports.

Figure 9:
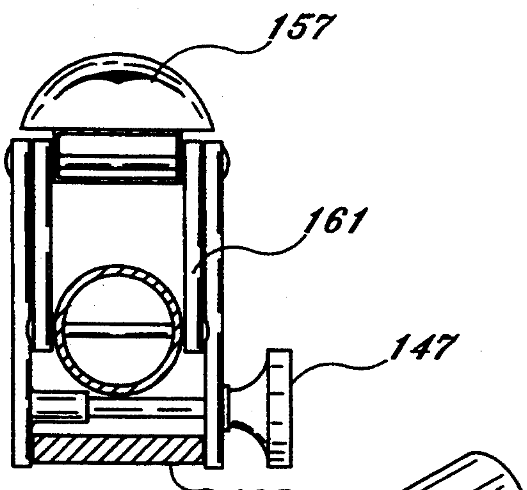
FIG. 9 shows an end elevated view in cross section of the parallel bar assembly of the alternate embodiment of the present invention.
Figure 8:
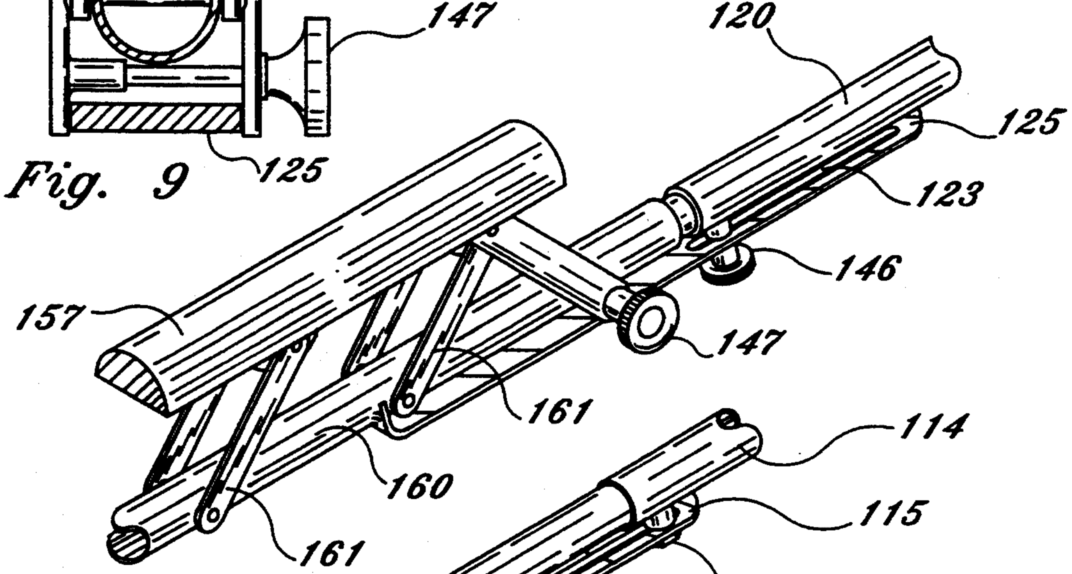
FIG. 8 shows a perspective view of the parallel bar assembly on one side, partially cut away, of the alternate embodiment of the present invention.
Figure 10:
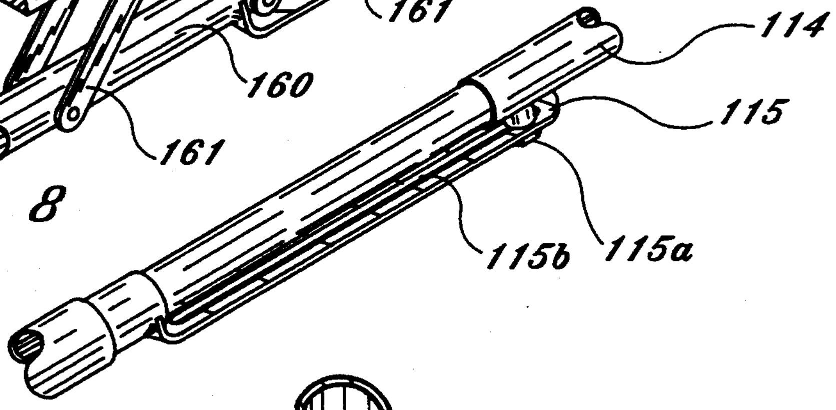
FIG. 10 shows a perspective view of the locking bracket that is used as a stop for the walker frame of the alternate embodiment in the extended position.

Referring now to FIG. 8, the parallel bar assembly is shown comprised of a parallel bar 157 pivotally connected to frame member 160 by parallelogram linkage 161. Extension bracket 125 is connected to frame member 160. Bracket 125 has a slot 123 disposed therein, wherein stopping bolt 146, which is rigidly attached to the frame member, acts as a limiter when the device is in the extended position. As shown, tension bolt 147 is connected to parallel bar 157. In order to elevate parallel bar 157, the user would release the tension on bolt 147 and push forward, causing linkage 161, which is pivotally mounted to frame member 160, to pivot, thereby causing bolt 147 to travel within the space provided between bracket 125 and frame member 160, thereby elevating the device. FIG. 9 shows the relationship between parallel bar 157, linkage 161, extension bracket 125, and tension bolt 147. As seen in FIG. 10, an extension bracket 115, corresponding to the extension bracket assembly described above, is provided on each lower horizontal frame member 114 and 124. Bracket 115 has a slot 115*b* disposed therein, wherein stopping bolt 115*a*, which is rigidly attached to the frame member, acts as a limiter when the device is in the extended position.

As can be seen, the two embodiments of the device are quickly and easily changed from one mode of operation to the other and such can be easily done by a patient who is desirous of either using one as a wheel chair or one who would like to get walking exercise using one of the devices. The preferred embodiment is capable of being stored or transported in a folded or collapsed position by merely raising the seat to its upper position and collapsing the chair. In addition, the alternate embodiment is considered to be more useful for institutions and for use by extra large and/or tall people (injured athletes for example) needing walking therapy.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A wheel chair that includes provisions for use as a patient walker comprising:

a pair of rigid vertical rear frame members;

a pair of rigid vertical front frame members;

a pair of lower horizontal frame members, each of said lower horizontal frame members connecting one of said pair of vertical front frame members to one of said pair of vertical rear frame members;

a pair of upper horizontal frame members;

a pair of auxiliary frame members, each auxiliary frame member connected at one end to one of said pair of lower horizontal frame members;

a wheel connected to each vertical frame member;

a first pair of telescoping frame members, each of said first pair of telescoping frame members telescopically fitted within one of said lower horizontal frame members and extendable therefrom;

a second pair of telescoping frame members, each of said second pair of telescoping frame members telescopically fitted within one of said upper horizontal frame members and extendable therefrom;

means for limiting telescopic action of said first pair of telescoping frame members and said second pair of telescoping frame members, said means for limiting comprising a pair of rods, each of said rods connected between one of said pair of vertical front frame members and one of said pair of vertical rear frame members;

a pair of handholds, each of said handholds connected to an upper portion of one of said vertical front frame members;

a rigid seat member; and a seat back connected between said vertical rear frame members;

said wheel chair being convertible between two modes of operation; a first, wheel chair mode wherein said first and second pair of telescoping frame members are retracted, and a second, walker mode wherein said first and second pair of telescoping frame members are extended.

2. A wheel chair as recited in claim 1, further including a removable, rotatable foot rest attached at a bottom end of each of said vertical front frame members.

3. A wheel chair as recited in claim 1, wherein each of said rods includes a housing attached thereto, each of said rods further including a spring stop, wherein extension of said first pair of telescoping frame members and said second pair of telescoping frame members is limited by said spring stop when forward movement of said spring stop reaches said housing.

4. A wheel chair as recited in claim 1, wherein each of said upper horizontal frame members includes a padded arm rest.

5. A wheel chair as recited in claim 1, further including pivotal means for allowing said rigid seat member to pivot between a downward fixed position for sitting and an upward vertical position to allow a greater stride when using said wheel chair in the walker mode.

6. A wheel chair as recited in claim 1, further including a collapsible cross-brace assembly comprising a pair of cross-brace members connected to and rotatable about said lower horizontal frame members.

7. A wheel chair as recited in claim 6, wherein said seat back is flexible and collapsible, thereby allowing said vertical rear frame members to be movable relative to each other such that said wheel chair is in a collapsed position.

8. A wheel chair as recited in claim 1, wherein said handholds are vertically adjustable for people of different heights.

9. A wheel chair as recited in claim 1, further including a pair of vertically adjustable parallel bars, each of said parallel bars pivotally mounted to one of said upper horizontal frame members, said parallel bars positioned rearwardly of said handholds.

10. A wheel chair that includes provisions for use as a patient walker comprising:

a pair of rigid vertical rear frame members;

a pair of rigid vertical front frame members;

a pair of lower horizontal frame members, each of said lower horizontal frame members connecting one of said pair of vertical front frame members to one of said pair of vertical rear frame members;

a pair of upper horizontal frame members;

a pair of auxiliary frame members, each auxiliary frame member connected between one of said upper horizontal frame members and one of said lower horizontal frame members;

a wheel connected to each vertical frame member;

a first pair of telescoping frame members, each of said first pair of telescoping frame members telescopically fitted within one of said lower horizontal frame members and extendable therefrom;

a second pair of telescoping frame members, each of said second pair of telescoping frame members telescopically fitted within one of said upper horizontal frame members and extendable therefrom;

a pair of rods for limiting telescopic action of said first pair of telescoping frame members and said second pair of telescoping frame members, each of said rods connected between one of said pair of vertical front frame members and one of said pair of vertical rear frame members, each of said rods including a housing attached thereto, each of said rods further including a spring stop, wherein extension of said first pair of telescoping frame members and said second pair of telescoping frame members is limited by said spring stop when forward movement of said spring stop reaches said housing;

a pair of vertically adjustable handholds, each of said handholds connected to an upper portion of one of said vertical front frame members;

a collapsible cross-brace assembly comprising a pair of cross-brace members connected to and rotatable about said lower horizontal frame members;

a rigid seat member; and a flexible, collapsible seat back connected between said vertical rear frame members, thereby allowing said vertical rear frame members to be movable relative to each other such that said wheel chair is in a collapsed position;

said wheel chair being convertible between two modes of operation; a first, wheel chair mode wherein said first and second pair of telescoping frame members are retracted, and a second, walker mode wherein said first and second pair of telescoping frame members are extended.

11. The wheel chair of claim 10, further including a removable, rotatable foot rest attached at a bottom end of each of said vertical front frame members.

12. A wheel chair as recited in claim 10, wherein said rigid seat member is hingedly attached to a sub-horizontal frame member for allowing said rigid seat member to pivot between a downward fixed position for sitting and an upward vertical position to allow a greater stride when using said wheel chair in the walker mode.

13. A wheel chair that includes provisions for use as a patient walker comprising:

a pair of rigid vertical rear frame members;

a pair of rigid vertical front frame members;

a pair of lower horizontal frame members, each of said lower horizontal frame members connecting one of said pair of vertical front frame members to one of said pair of vertical rear frame members;

a collapsible cross-brace assembly comprising a pair of cross-brace members connected to and rotatable about said lower horizontal frame members;

a pair of upper horizontal frame members;

a pair of auxiliary frame members, each auxiliary frame member connected at one end to one of said pair of lower horizontal frame members;

a wheel connected to each vertical frame member;

a first pair of telescoping frame members, each of said first pair of telescoping frame members telescopically fitted within one of said lower horizontal frame members and extendable therefrom;

a second pair of telescoping frame members, each of said second pair of telescoping frame members telescopically fitted within one of said upper horizontal frame members and extendable therefrom;

a pair of handholds, each of said handholds connected to an upper portion of one of said vertical front frame members;

a rigid seat member; and a seat back connected between said vertical rear frame members;

said wheel chair being convertible between two modes of operation; a first, wheel chair mode wherein said first and second pair of telescoping frame members are retracted, and a second, walker mode wherein said first and second pair of telescoping frame members are extended.

14. A wheelchair as recited in claim 13, wherein said seat back is flexible and collapsible, thereby allowing said vertical rear frame members to be movable relative to each other such that said wheel chair is in a collapsed position.

* * * * *

UNITED STATES PATENT AND TRADEMARK OFFICE
CERTIFICATE OF CORRECTION

PATENT NO. : 5,419,571
DATED : MAY 30, 1995
INVENTOR(S) : Jack N. Vaughan

It is certified that error appears in the above-identified patent and that said Letters Patent is hereby corrected as shown below:

Column 4, line 31, delete "TEE" and insert --THE--.

Column 4, line 38, delete "to a horizontal frame member 14 and 24 which also connect to the wheel" and insert --to horizontal frame members 14R and 14L which also connect to the wheels--.

Signed and Sealed this

Third Day of October, 1995

Attest:

BRUCE LEHMAN

*Attesting Officer* *Commissioner of Patents and Trademarks*